United States Patent Office 3,023,958

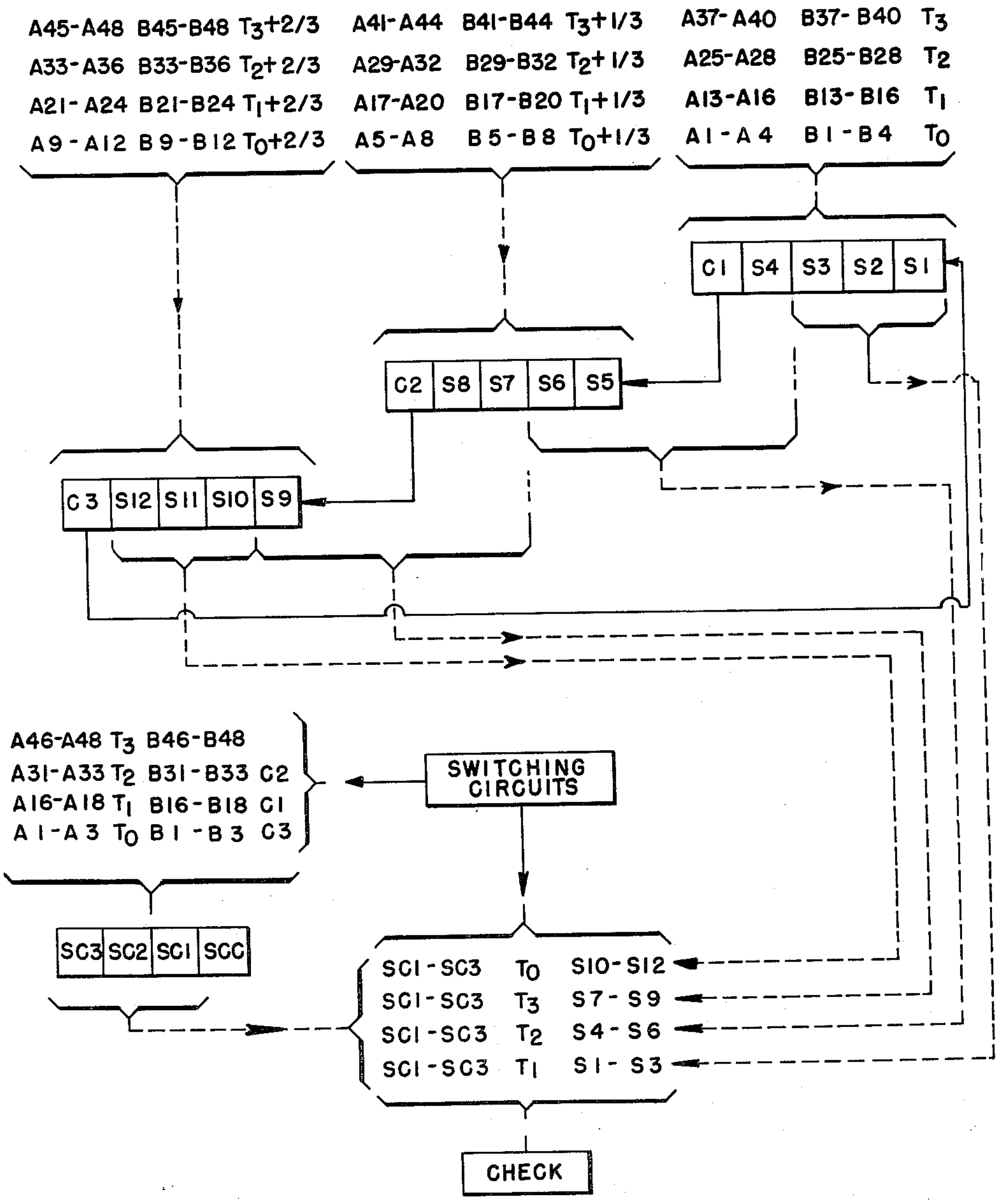
INVENTOR.
ALFRED M. KAUFMAN
BY Henry L. Hanson
ATTORNEY

Patented Mar. 6, 1962

3,023,958

INFORMATION HANDLING APPARATUS

Alfred M. Kaufman, Arlington, Mass., assignor to Minneapolis-Honeywell Regulator Company, Minneapolis, Minn., a corporation of Delaware Filed Aug. 14, 1959, Ser. No. 833,852
15 Claims. (Cl. 235—153)

A general object of the present invention is to provide a new and improved apparatus for use with a digital data processor. More specifically, the present invention is concerned with an improved data processing circuit which incorporates a means for checking the operation of the data processor wherein the checking means for verifying proper operation of the processor produces a powerful check with a minimum amount of checking circuitry.

While digital data processors operate with a very high degree of accuracy, there nevertheless are times when transient errors are created due to external signal interference, and other errors created by component failure which may be either continuous or intermittent. In a digital data processor of the type using electrical pulses, particularly in high-speed electronic data processors, the chance of an error occurring, transient or otherwise, is always present. While some data processing can be carried out and continued even though there may be a partial failure of the associated equipment, this can generally not be tolerated particularly in the area of scientific calculations, numerical data processing, and the like. Consequently, practically all forms of data processors incorporate some type of checking means to ensure that any error that may occur within the processor is detected.

The checking techniques which have heretofore been incorporated have either been very expensive to implement or, if the checking equipment has been minimized, there has been a corresponding reduction in the ability of the checking circuit to detect errors that may occur. One way to check a data processor is to provide a complete duplication of all of the data processing functions and stop the data processor if the data processor and its duplicate counterpart do not produce the same results in any data processing operation. This is obviously expensive to implement in that it requires complete duplication of circuitry throughout. Another form of data processing check may involve a weighting scheme which permits the generation of a satellite number which is carried with the data being processed. The satellite number provides a means whereby it is possible to check not only transfers within the data processor, but also arithmetic functions by appropriately relating the satellite number associated with each operand and the result of the operation. While this form of checking minimizes the amount of equipment required, it is possible for certain types and combinations of data processing errors to be passed undetected.

In accordance with the teachings of the present invention, there is provided a monitor circuit for the data processor which functions on a roving basis to scan the operation of different segments of the data processor and produce an error indication in the event that an error condition is detected.

It is accordingly a further more specific object of the present invention to provide a new and improved data processor checking circuit which comprises a roving monitor circuit which is adapted to selectively check different portions of a data processor in order to determine whether or not the processor is operating properly.

A further more specific object of the present invention is to provide a new and improved roving checking circuit for a data processor wherein a checking circuit duplicates the operation of selected portions of the data processor and the output thereof is compared with the output of the data processor related to the area where the check is performed.

The foregoing objects and features of novelty which characterize the invention, as well as other objects of the incention, are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Referring to the single figure, there is here illustrated diagrammatically a parallel adder operating in a parallel-serial mode. The adder is intended as representing a typical data processing circuit which is adapted to be utilized with the principles of the present invention. As illustrated, it is intended that the added circuit operate to add a pair of forty-eight-bit operands A and B. In order to effect this addition, the addition is adapted to take place in four steps in a twelve-bit parallel added circuit.

The adder stages are illustrated diagrammatically by the blocks S1 through S12, to thereby represent a twelve-bit parallel adder. The first four adder stages S1 through S4 have associated therewith a circuit for generating a carry. This carry circuit C1 is adapted to generate a simultaneous carry substantially at the same instant that the sum is being created within the adder stages S1 through S4. Note that the sum and carry outputs are available for use 1/3 PP after the insertion of the original operands. Similarly, a simultaneous carry circuit C2 is associated with the adder stages S5 through S8. A further carry circuit C3 is associated with the adder stages S9 through S12.

The adder circuit illustrated is adapted to perform a twelve-bit addition within a single timing period or pulse period. In the illustrated form of the adder, it is intended that each of the three four-stage sections of the adder operate with a time separation of approximately one-third of a timing period or pulse period. Thus, if the stages S1 through S4 are adapted to receive their input data which include the previously generated carry at time $T_0$, the stages S5 through S8 are adapted to receive their inputs at $T_0$ plus one-third. Similarly, the adder stages S9 through S12 are adapted to receive their inputs at time $T_0$ plus two-thirds.

At the end of the first timing or pulse period, after the first twelve bits of the two operands have been added, the next twelve bits, 13 through 24, will be applied to the adder. At the same time, the sum on the output of the adder may be transferred to an appropriate register for storage until the adding operation has been completed. The adder will continue to perform its operation, twelve bits at a time, until all forty-eight bits of the two operands have been added.

In order to check the operation of the adder, there is provided a monitor circuit comprising three adder stages SC1, SC2, and SC3. Also included in this adder circuit is a carry input circuit SCC. These latter adder stages are adapted to operate in the parallel mode with the inputs thereof being derived from the same sources as the information from the main adder. In this case, however, the inputs are derived from selected ones of the input bits so as to provide for the duplicating of the operation of a segment of the main adder. Thus, the adder check circuit stages are adapted to provide four separate additions. The first addition is the addition of the bits A1 through A3, and B1 through B3, along with a carry bit corresponding to the carry C3. This will mean that the adder stages SC1 through SC3 will be producing the same sum as the adder stages S1 through S3 of the main adder such that at the end of the first adding cycle, the sum existing in the monitor adder, or check adder, should correspond to the sum in the first three stages S1 through S3. Switching circuits are provided for selecting the inputs to the data inputs so that the next monitor operation to be performed will be performed on the bits A16 through A18 and B16 through B18, along with the output of a carry circuit corresponding to the carry C1. It will be noted that, in this instance, the monitor or check circuit will be producing a sum corresponding to the sum on the output of the main adder stages S4 through S6.

The next pulse period is so arranged that the adder monitor circuit will have on the input thereof the bits A31 through A33, and B31 through B33, along with the carry signal corresponding to the output of the carry circuit C2. The monitor adder or check adder will, at this point, be producing a sum corresponding to the sum being produced in the main adder stages S7 through S9.

On the final cycle of the check, the monitor adder stages wlil have applied thereto the data bits A46 through A48, and B46 through B48. The check circuit will thus be producing a sum in the manner in which the main adder stages S10 through S12 will be producing a sum.

In order to determine whether or not the sum produced by the monitor adder corresponds to the sum from the corresponding section of the main adder, a checking circuit is provided so that a bit-by-bit check may be made to compare the outputs of the monitor adder and the main adder in the corresponding bit positions. In the event that there is a discrepancy between the bit combinations in the two adders of the points in comparison, the check circuit may be activated to produce an indication of an error.

The adder circuitry, as well as the simultaneous carry generation circuitry, may take the form of many types of circuits well known in the art. Representative circuitry which may be utilized in the present scheme is illustrated in the book entitled Arithmetic Operations in Digital Computers, by R. K. Richards, 1955, (Van Nostrand), noting in particular chapter 4.

In considering the operation of the present invention, it should be noted that there is provided a data processor taking the form, as illustrated herein, of an adder. In order to monitor the operation of that adder, there is provided a monitor adder which is adapted to rove, or scan, the operation of the main adder and produce segmented sums corresponding to the sum produced in the corresponding section of the main adder associated with the monitor adder at the particular instant that the monitor is operative.

More specifically, the monitor adder first makes a specific comparison by way of duplicating the functioning of the adder stages S1 through S3, and the output thereof is checked at time $T_1$ in the check circuit with the sum produced by the adder stages S1 through S3.

At the time of the next adding operation within the main adder, namely, at the time $T_1$, when the bits A13 through A24 are being applied to the main adder, the monitor check circuit will produce a sum which should correspond to the sum being produced by the adder stages S4 through S6. If an appropriate check of agreement between the sums of the main adder and the monitor adder are indicated in the check circuit, the apparatus will step on to the next time interval, at which time the A and B operand bits 25 through 36 are applied to the main adder and at which time the monitor adder stages SC1 through SC3 will be producing a sum corresponding to the sum produced by the adder stages S7 through S9. If the resultant sums of the stages S7 through S9 correspond to the sums produced by the stages SC1 through SC3, the check circuit will indicate a correspondence. A further check will be made in the final cycle of the adding operation so that when A and B operand bits 37 through 48 are applied to the main adder, the monitor adder will be making a comparison of the sum produced in the stages S10 through S12.

It will be noted that by the time the complete adding operation has been accomplished in the main adder in the four pulse periods assigned to the adding operation, the monitor adder will have scanned each individual stage of the main adder to determine the operability thereof. It will further be apparent that since the final check is made in the high-order bit positions of the adder at the completion of the adding operation, that any errors that may have occurred in any low-order bit positions during a previous adding operation may propagate an error into the high-order bit positions by way of the carry operations in the main adder circuit. Consequently, this ensures monitoring of the adding operation while it is in process, as well as a check on the final result.

It will further be apparent that while the present apparatus has been described as being applicable to an adder circuit, it may be applied equally well to other types of data processing or data manipulating circuits, including data transfer circuits, shifting circuits, and the like.

While, in accordance wtih the provisions of the statutes, there has been illustrated and described the best forms of the invention known, it will be apparent to those skilled in the art that changes may be made in the apparatus described without departing from the spirit of the invention as set forth in the appended claims, and that in some cases, certain features of the invention may be used to advantage without a corresponding use of other features.

Having now described the invention, what is claimed as new and novel and for which it is desired to secure by Letters Patent is:

1. A circuit for a data manipulator comprising checking means continuously connected to a data source common to said data manipulator to duplicate the operation to be performed by only a portion of said data manipulator, and means connected to said data manipulator and to said checking means to compare the outputs thereof.

2. In combination, a data manipulator, checking means connected continously to a data source common to said data manipulator to duplicate the operation to be performed by only a portion of said data manipulator, switching means connected to said checking means to duplicate different operative portions of said data manipulator, and means connected to said data manipulator and to said checking means to compare the outputs thereof.

3. In a circuit for a data manipulator, the combination comprising checking means continuously connected to a data source common to said data manipulator to duplicate the operation to be performed by only a portion of said data manipulator, timed switching means connecting said checking means to duplicate in time sequence different operative portions of said data manipulator, and signal comparison means connected to said data manipulator and to said checking means to compare the outputs thereof.

4. In apparatus for checking the operation of an adder circuit for digital data applied to the input thereof, the combination comprising a plurality of data inputs, an adder monitor having an input adapted to receive data from only a selected portion of said data inputs to add the data thereon, and means continuously connecting the output of said adder and the output of said adder monitor to compare the sums produced thereby.

5. In apparatus for checking the operation of an adder circuit for digital data applied to the input thereof, the combination comprising a plurality of data inputs, an adder monitor having an input adapted to receive data from a selected portion of said data inputs to add the data thereon, switching means connected to the input of said adder monitor, said switching means being adapted to connect different ones of said plurality of inputs to said adder monitor, and means connecting the output of said adder and the output of said adder monitor to compare the sums produced thereby.

6. In apparatus for checking the operation of a multibit parallel digital adder circuit having a plurality of adder stages, the combination comprising a plurality of data inputs, a parallel adder monitor having less adder stages than said adder circuit and having an input adapted to receive data from a selected portion of said data inputs to add the data thereon, and means connecting a selected portion of the output of said adder and the output of said adder monitor to compare the sums produced thereby.

7. Apparatus as defined in claim 6 wherein switching means are connected to the input of said adder monitor to selectively connect different combinations of inputs to said adder monitor.

8. Data processing check apparatus comprising a data manipulator, a check monitor connected to manipulate only a portion of the data manipulated by said manipulator, and manipulation comparison means connected to the outputs of said check monitor and selected outputs of said data manipulator.

9. Data processing check apparatus comprising a data manipulator, a continuously roving check monitor connected to manipulate selected portions of the data manipulated by said manipulator, and comparison check means connected to the outputs of said check monitor and selected outputs of said data manipulator.

10. Data processing check apparatus comprising a data manipulator, a check monitor connected to manipulate continuously different portions of the data manipulated by said manipulator, timed switching means connecting said check monitor to different portions of said data to be manipulated, and time-controlled comparison means connected to the outputs of said check monitor and selected outputs of said data manipulator.

11. A data processor checking means comprising a continuously roving operational checker adapted to simulate selectively different functions of a data processor, and means connecting said operational checker to compare the output thereof with a related operation of said data processor.

12. A data processor checking means comprising a continuously roving operational checker adapted to duplicate selectively different functions of a data processor, and time-controlled switching means connecting said checker to compare the output thereof with a related operation of said data processor.

13. In combination, an adder, a continuously roving adder checker adapted to simulate slectively different operational functions of said adder, and means connecting said checker to compare the output thereof with a related output of said adder.

14. The combination as defined in claim 13 wherein said adder checker is adapted to scan in time sequence all adding positions of said adder.

15. The combination as defined in claim 14 wherein said adder checker is connected to scan the high order position of said adder at the completion of an adding operation.

References Cited in the file of this patent

UNITED STATES PATENTS

| | | |
|---|---|---|
| 2,340,809 | Hatton | Feb. 1, 1944 |
| 2,844,309 | Ayres | July 22, 1958 |
| 2,879,001 | Weinberger et al. | Mar. 24, 1959 |

OTHER REFERENCES

Auerbach et al.: The Binac, Proceedings of the I.R.E., Jan. 1952, pages 12 and 13.